UNITED STATES PATENT OFFICE.

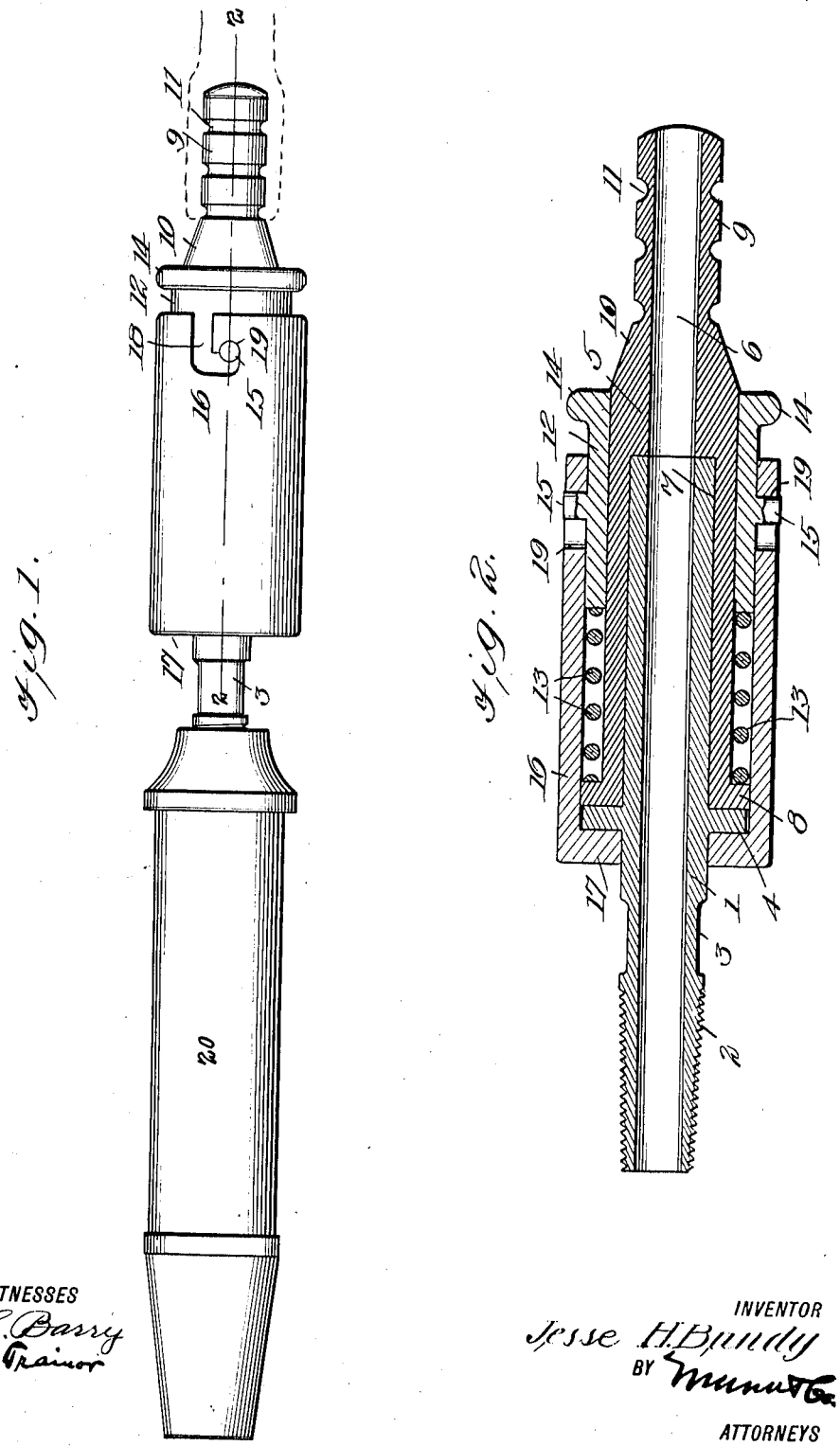

JESSE HARPER BUNDY, OF GREENFIELD, INDIANA.

SWIVEL-JOINT HOSE-COUPLING.

1,020,258.   Specification of Letters Patent.   Patented Mar. 12, 1912.

Application filed August 30, 1911. Serial No 646,790.

*To all whom it may concern:*

Be it known that I, JESSE H. BUNDY, a citizen of the United States, and a resident of Greenfield, in the county of Hancock and State of Indiana, have invented certain Improvements in Swivel-Joint Hose-Couplings, of which the following is a specification.

My invention is an improvement in swivel joint hose couplings, and has for its object, the provision of a simple, inexpensive and easily operated coupling which while preventing accidental longitudinal movement of the sections of the coupling with respect to each other, will permit their free relative rotation, and wherein the sections may be easily connected and disconnected, without the use of tools.

In the drawings: Figure 1 is a plan view of the improvement; and, Fig. 2 is an enlarged sectional view, taken on the line 2—2 of Fig. 1.

In the present embodiment of the invention a nipple 1 is provided having a tapering threaded portion 2 at one end, and an annular external groove 3, between the said portion and the main portion, and an annular rib or flange 4 on the opposite side of the groove from the threaded portion. A socket 5 is provided with a bore 6, having an enlarged portion 7 at one end, for receiving the main portion of the nipple, and the said end of the socket is annularly flanged at 8, the said flange abutting against the flange 4 of the nipple. The end 9 of the socket remote from the flange 4, is reduced, and is connected to the main portion by a tapering portion 10, and the said portion 9 is provided with spaced annular grooves or corrugations 11, for permitting the attachment of the hose. A retaining sleeve 12 encircles the socket, and a coil spring 13 encircles the socket, between the adjacent end of the sleeve and the flange 8. The inner end of the sleeve is annularly flanged at 14, and the said sleeve is provided with oppositely arranged radial pins 15, adjacent to the flange 14. A casing or lock sleeve 16 incloses the spring and the inner end of the retaining sleeve. The outer end of the said sleeve 16 is provided with an internal flange 17, which fits against the rib 4, on the opposite side from the flange 8. The casing or sleeve 16 extends over the sleeve 12, to approximately the end of the nipple, and is provided with bayonet slots 18, for engagement by the pins 15, to lock the sleeves 12 and 16 together. The flange 8 fits the interior of the sleeve 16, and the nipple is free to rotate in the socket, the rib 4 preventing relative longitudinal movement of the said nipple and socket. Each of the slots 18 consists of a portion longitudinal to the nipple, a portion transverse to the nipple, and a notch or recess 19 at the end of the said portion for engagement by the pins to lock the parts from rotation.

The parts may be easily released by pressing the sleeves toward each other, until the pins 15 are released from the recesses 19. The sleeves are then rotated slightly with respect to each other, until the pins 15 enter the inner portions of the slots, when the spring 13 forces the socket away from the nipple.

The nozzle 20 is threaded onto the portion 2 of the nipple, and it will be evident that the said nozzle and nipple may rotate freely with respect to the socket. The spring prevents the possibility of accidental unlocking of the parts. The nipple, and the socket are the coupling sections, and each section has a sleeve journaled thereon and provided with means for preventing the section from movement in outward direction away from the other section, and the socket is yieldingly connected with its sleeve.

It will be noted that the improvement is especially adapted for use in the operation of pneumatic hammers, on account of the absence of the usual elastic packing.

I claim:

A device of the character described, comprising a nipple having a threaded portion at one end for engagement by a nozzle and having an annular rib intermediate its ends, a socket having one end reduced for engaging the hose, and being internally enlarged at the other end to fit over the nipple, said socket having an annular flange at the end adjacent to the rib and fitting against the said rib, a retaining sleeve fitting over the socket and having a lateral flange at its outer end, and oppositely arranged pins adjacent to the flange, a spring encircling the socket between the sleeve and the flange of the socket, and a locking sleeve fitting over the spring and having an internal flange engaging the rib on the opposite side from the socket flange, and having bayonet slots for engagement by the pins.

JESSE HARPER BUNDY.

Witnesses:
    JOHN H. BROOKS,
    C. W. GANT.